United States Patent
Tsuboi et al.

(10) Patent No.: US 8,740,351 B2
(45) Date of Patent: Jun. 3, 2014

(54) INK JET PRINTING SYSTEM, INK JET PRINTING METHOD, AND STORAGE MEDIUM

(75) Inventors: Hitoshi Tsuboi, Kawasaki (JP); Yoshitomo Marumoto, Yokohama (JP); Hiromitsu Yamaguchi, Yokohama (JP); Ryota Kato, Yokohama (JP); Yohei Masada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 633 days.

(21) Appl. No.: 12/966,163

(22) Filed: Dec. 13, 2010

(65) Prior Publication Data

US 2011/0148970 A1 Jun. 23, 2011

(30) Foreign Application Priority Data

Dec. 18, 2009 (JP) .................. 2009-287539

(51) Int. Cl.
*B41J 2/21* (2006.01)
(52) U.S. Cl.
USPC .................. 347/43; 347/15; 347/41
(58) Field of Classification Search
USPC .......... 347/41
See application file for complete search history.

(56) References Cited

U.S. PATENT DOCUMENTS

| | | | |
|---|---|---|---|
| 6,779,873 B2* | 8/2004 | Maeda et al. | 347/43 |
| 7,240,988 B2* | 7/2007 | Gardner et al. | 347/43 |
| 7,438,374 B2 | 10/2008 | Shibata et al. | |
| 7,911,650 B2 | 3/2011 | Jahana et al. | |
| 8,091,975 B2 | 1/2012 | Kaneko et al. | |
| 2005/0219294 A1 | 10/2005 | Nakazawa et al. | |
| 2008/0158280 A1 | 7/2008 | Imai | |
| 2008/0246791 A1 | 10/2008 | Kaneko et al. | |
| 2009/0002414 A1* | 1/2009 | Shibata et al. | 347/9 |

FOREIGN PATENT DOCUMENTS

| | | |
|---|---|---|
| JP | 2005-297212 A | 10/2005 |
| JP | 2008-16209 A | 1/2008 |
| JP | 2008-162095 A | 7/2008 |
| JP | 2008-173969 A | 7/2008 |

OTHER PUBLICATIONS

Japanese Office Action issued in counterpart application No. 2009-287539 dated Sep. 10, 2013, along with its English-language translation—6 pages.

* cited by examiner

*Primary Examiner* — Uyen Chau N Le
*Assistant Examiner* — Chad Smith
(74) *Attorney, Agent, or Firm* — Fitzpatrick, Cella, Harper & Scinto

(57) ABSTRACT

The present invention provides an ink jet printing system and method which allows high-quality images to be printed while improving the gloss of an image surface, as well as a relevant storage medium. According to the present invention, an image is printed using a print head including multiple nozzle arrays provided for ink in respective multiple colors and in each of which multiple nozzles configured to eject ink are arranged; the print head ejects the ink in the multiple colors onto the same print area on a print medium during multiple scans. The multiple types of ink are ejected from the print head so that the connectivity of ink dots formed on the front outermost surface of a print area is higher than that of other ink dots formed in the print area.

9 Claims, 16 Drawing Sheets

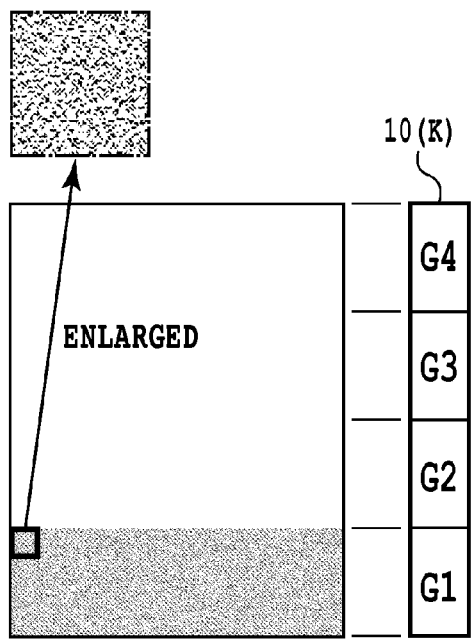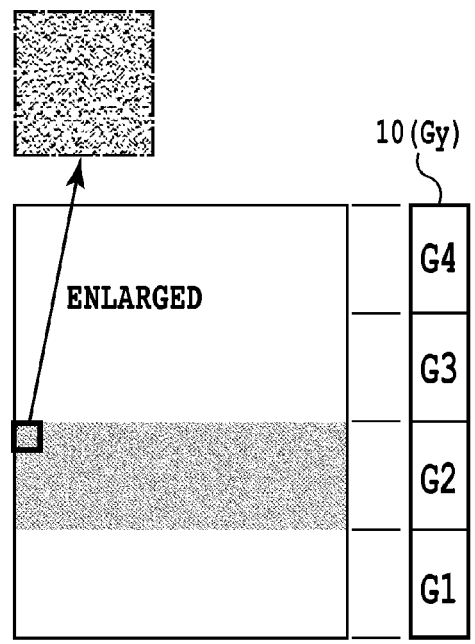
FIG.7A    FIG.7B
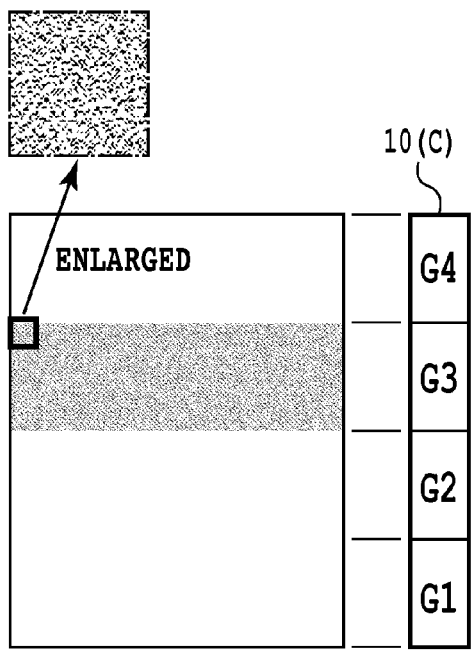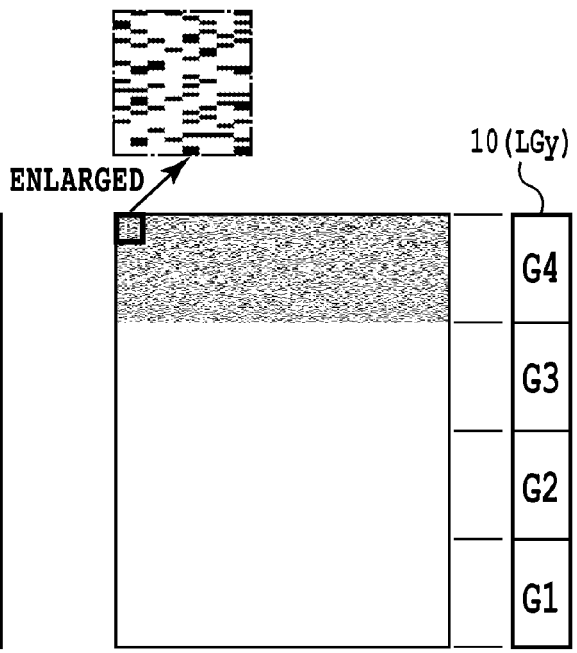
FIG.7C    FIG.7D

INK JET PRINTING SYSTEM, INK JET PRINTING METHOD, AND STORAGE MEDIUM

BACKGROUND OF THE INVENTION

1. Field of the Invention

The present invention relates to a an ink jet printing system and method using a print head including nozzle arrays for respective different types of ink and in which the print head performs a plurality of scans to print an image in a predetermined area on a print medium, as well as a relevant storage medium.

2. Description of the Related Art

A multi-pass printing scheme is a printing scheme for ink jet printing apparatuses; in the multi-pass printing scheme, an image is printed in a stepwise fashion by a plurality of print scans of the same print area on a print medium. In the multi-pass printing scheme, an image is printed while repeating a print scan in which ink is ejected from a print head being moved in a main scanning direction and a conveying operation of conveying the print medium in a sub-scanning direction by 1/N of a print width for a single print scan. In the multi-pass printing, the print medium is conveyed between the current print scan and the next print scan. Thus, the print head provides ink droplets to the same print area on the print medium at predetermined time intervals. Thus, for print media such as plain paper which slowly absorbs pigment ink, printing can be performed while ink droplets applied to the print media are being dried. As a result, the ink can be appropriately fixed to the print media.

However, when multi-pass printing is performed on print media such as glossy paper the surface of which is specially processed, the glossiness of an image print portion may be impaired.

In general, fine pores are formed in the surface of print media such as glossy paper to improve absorption of an ink solvent and fixation of a color material. For dye ink, the dye is absorbed via the pores together with moisture. However, for pigment ink, pigment molecules are difficult to dissolve into water and disperse in the moisture in the form of particulates. Each of the particulates is larger than the pore. Thus, the color material is difficult to permeate to the interior of the print medium. That is, it is expected that the pigment particulates are fixed to the surface of the print medium in such a way as to be accumulated, thus impairing the smoothness of the surface to make the surface non-glossy.

Moreover, in the multi-pass printing, if pigment ink is used which contains a color material difficult to permeate to the interior of the print medium, the ink applied during each print scan dries sequentially on the print medium and is overlappingly fixed. For example, in multi-pass printing (four-pass printing) in which an image is completed by scanning the same print area on the print medium four times, four layers of ink are laid on top of one another. In contrast, in single-pass printing (one-pass printing) in which an image is completed by scanning the same print area on the print medium once, one ink layer is formed. Thus, the multi-pass printing provides the surface of the print medium with larger irregularities and is more likely to make the surface non-glossy than the single-pass printing.

As is well known, the ink jet printing scheme has the following characteristics. If ink droplets applied to the print medium during the same scan (same pass) come into contact with one another on the print medium surface before the fixation is completed, leveling occurs to reduce the irregularities of the print medium surface to improve the gloss of the surface.

Japanese Patent Laid-Open Nos. 2005-297212 and 2008-162095 disclose techniques of varying the probability of the contact between two ink droplets to control the level of leveling to achieve preferable gloss. That is, the technique in Japanese Patent Laid-Open No. 2005-297212 is used for an ink jet printing apparatus using pigment ink, to allow the number of passes or a mask pattern to be selected in accordance with the glossiness of the print medium. This allows a change in the number of passes and thus in the print ratio for the same pass. Furthermore, according to the technique in Japanese Patent Laid-Open No. 2008-162095, the mask pattern is selected in accordance with the glossiness of the print medium to change the continuity of ink dots formed during the same pass. This makes ink droplets likely to come into contact with one another during the same pass for each of plural types of ink. These techniques enable the appropriate glossiness of the glossy print medium to be maintained with degradation of glossiness of the image print portion minimized.

However, if the method disclosed in Japanese Patent Laid-Open No. 2008-162095 is used to perform printing such that ink droplets come into contact with one another on the print medium for each of plural types of ink, dots of each type of ink are excessively large. Thus, particularly colors with low lightness become noticeable to degrade the granularity of images. On the other hand, according to the method disclosed in Japanese Patent Laid-Open No. 2005-297212, a reduction in the number of passes may lead to beading in which ink droplets stick to one another, causing the stuck ink droplets to be localized. This may degrade the granularity.

Furthermore, if ink droplets previously formed on the print medium hinder permeation of subsequently applied ink droplets (subsequent ink droplets), the subsequent ink may concentrate and aggregate in an uncolored area on the print medium in which ink dots have not been formed yet. In this case, the subsequent ink with a high color material concentration becomes massive during the aggregation. This makes the irregularities on the surface of the print medium larger to allow light to scatter more wildly. As a result, the gloss of the surface may be degraded. Moreover, since ink with a high color material concentration and a low lightness is more noticeable, localization and aggregation of such ink may degrade the granularity of images.

As described above, the conventional printing methods have difficulty suppressing degradation of the gloss resulting from the irregularities on the surface of the print medium and degradation of granularity of images at the same time. In particular, if a high density image is printed, as ink with a high color material concentration is used for printing, the irregularities on the surface of the print medium are likely to be larger, resulting in a reduction in the glossiness of the surface.

SUMMARY OF THE INVENTION

The present invention provides an ink jet printing system and method which allows high-quality images to be printed while improving the gloss of the image surface, as well as a relevant storage medium.

In the first aspect of the present invention, there is provided an ink jet printing system configured to print an image using a print head comprising a plurality of nozzle arrays provided for ink in respective plurality of colors and in each of which a plurality of nozzles configured to eject ink are arranged along a predetermined direction, the print head ejecting the ink in the plurality of colors onto an identical print area on a print medium during a plurality of scans in a main scanning direction crossing the predetermined direction, the system comprising:

a data generation unit configured to generate data to be printed during each of the plurality of scans, from the image data to be printed on the identical print area, using a mask pattern group including a first mask pattern and second mask pattern in which the number of printing allowed pixels each with a printing allowed pixel present adjacent thereto is smaller than that of the first mask pattern, wherein the data generation unit uses the first mask pattern to generate image data to be printed during at least a final scan of the plurality of scans.

In the second aspect of the present invention, there is provided an ink jet printing method of printing an image using a print head comprising a plurality of nozzle arrays provided for ink in respective plurality of colors and in each of which a plurality of nozzles configured to eject ink are arranged along a predetermined direction, the print head ejecting the ink in the plurality of colors onto an identical print area on a print medium during a plurality of scans in a main scanning direction crossing the predetermined direction, the method comprising:

a data generation step of generating data to be printed during each of the plurality of scans, from the image data to be printed on the identical print area, using a mask pattern group including a first mask pattern and second mask pattern in which the number of printing allowed pixels each with a printing allowed pixel present adjacent thereto is smaller than that of the first mask pattern, wherein in the data generation step, the first mask pattern is used to generate image data to be printed during at least a final scan of the plurality of scans.

In the third aspect of the present invention, there is provided a storage medium in which a storage medium in which a computer readable program is stored, the program allowing a computer to function as a data generation apparatus that generates data allowing a print head to apply ink in a plurality of colors to an identical print area on a print medium during a plurality of scans, wherein the function of the data generation apparatus is executed such that data to be printed during each of the plurality of scans is generated from the image data to be printed on the identical print area, using a mask pattern group including a first mask pattern and second mask pattern in which the number of printing allowed pixels each with a printing allowed pixel present adjacent thereto is smaller than that of the first mask pattern, and such that the first mask pattern is used to generate image data to be printed during at least a final scan of the plurality of scans.

According to the present invention, ink dots formed on the front outermost surface of the print area printed by a plurality of scans are noted. The connectivity of these dots is set to be higher than that of the other ink dots to reduce the irregularities on the front outermost surface, thus improving the gloss of the image surface. Furthermore, the connectivity of all the types of ink other than that with which dots are formed on the front outermost surface is reduced. This enables the granularity of images to be prevented from being degraded by the excessive connectivity of the dots. Therefore, high-quality images can be printed.

Further features of the present invention will became apparent from the following description of exemplary embodiments with reference to the attached drawings.

BRIEF DESCRIPTION OF THE DRAWINGS

FIG. 7A to FIG. 7D are diagrams illustrating a group of nozzles-used in a first print head to a fourth print head, respectively;

DESCRIPTION OF THE EMBODIMENTS

Embodiments of the present invention will be described below with reference to the drawings.

First Embodiment

Figure 1A:
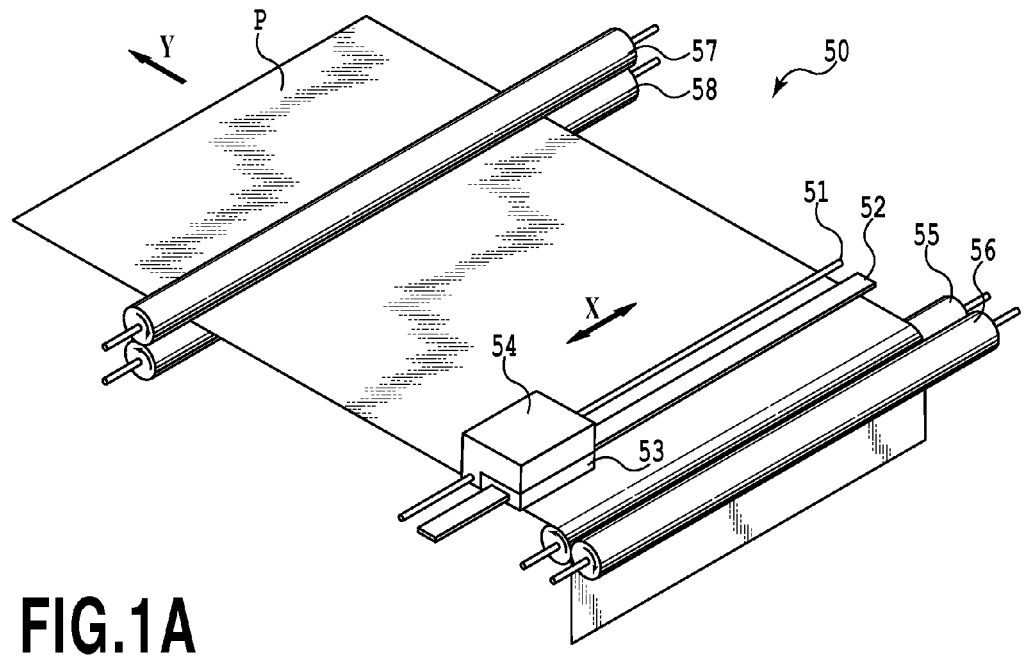
FIG. 1A is a schematic perspective view of an essential part of an ink jet printing apparatus to which the present invention can be applied.

FIG. 1A is a schematic perspective view of an essential part of a printing apparatus to which the present invention can be applied. A printing apparatus 50 in the present example is of a serial scan type. Guide shafts 51 and 52 are configured to guide a carriage 53 so that the carriage 53 moves in a main scanning direction shown by arrow X. The carriage 53 is reciprocated in the main scanning direction by a carriage motor and a driving force transmitting mechanism such as a belt which transmits the driving force of the carriage motor. A print head 10 (not shown in FIG. 1A) and an ink tank 54 from which ink is fed to the print head 10 are mounted on the carriage 53. The print head 10 and the ink tank 54 may form an ink jet cartridge. A sheet P as a print medium is conveyed, by sheet feeding rollers 55 and 56 and conveying rollers 57 and 58, in a sub-scanning direction shown by arrow Y and crossing the main scanning direction (in the present example, crossing the main scanning direction at right angles). The printing apparatus 50 sequentially prints images on the sheet P by repeating a printing operation of allowing the print head 10 to eject ink onto the sheet P while moving the print head 10 in the main scanning direction and a conveying operation of conveying the sheet P in the sub-scanning direction by a predetermined amount.

Figure 1B:
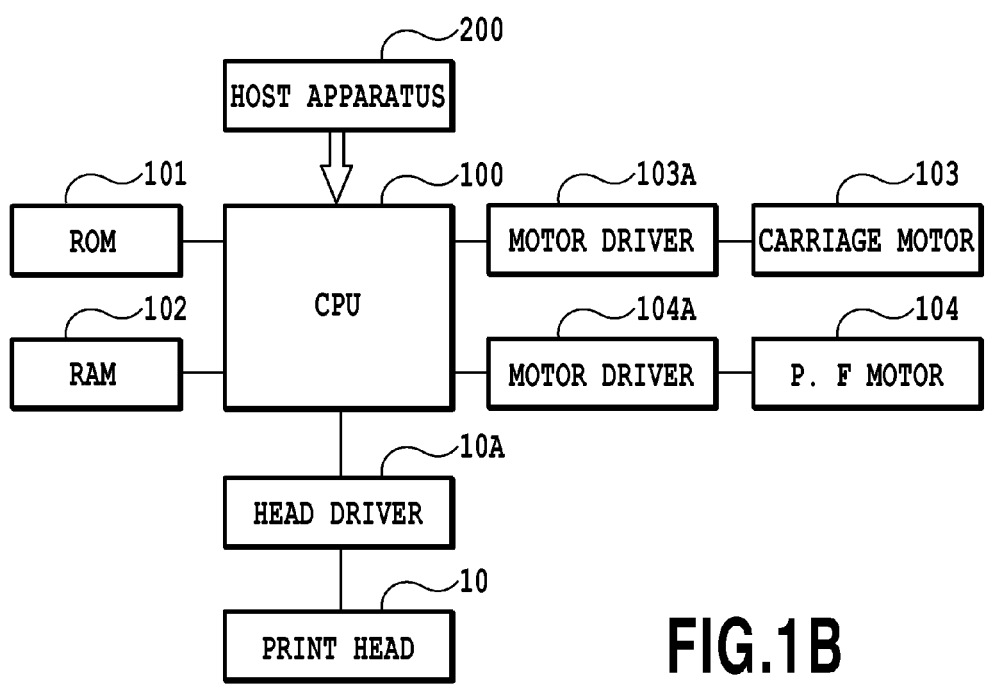
FIG. 1B is a block diagram of a control system for the ink jet printing apparatus in FIG. 1A.

FIG. 1B is a schematic block diagram of hardware and software in a computer serving as an ink jet printing system according to the present invention. A CPU 100 executes processes of controlling the operation of the present printing apparatus, processes such as data generation, and the like.

Programs for procedures of the above-described processes and the like are stored in a ROM 101. A RAM 102 is used as a work area in which the processes are executed. The print head 10 includes a plurality of ejection ports, a plurality of ink channels communicating with the respective ejection ports, and a plurality of ejection energy generating elements provided in the respective ink channels. These components form a plurality of nozzles through which ink can be ejected. Electrothermal conversion elements or piezoelectric elements may be used as the ejection energy generating elements. If the electrothermal conversion elements are used, heat generated by each of the electrothermal conversion elements may be used to bubble the ink in the ink channel so that the resultant bubbling energy can be utilized to eject the ink through the ejection port. Ejection of the ink from the print head 10 can be carried out by the CPU 100 by driving the electrothermal conversion element via a head driver 10A. The CPU 100 controls, via a motor driver 103A, a carriage motor 103 configured to drive the carriage 53 in the main scanning direction. The CPU 100 also controls, via a motor driver 104A, a P. F motor 104 configured to convey the sheet P in the sub-scanning direction.

Figure 2:
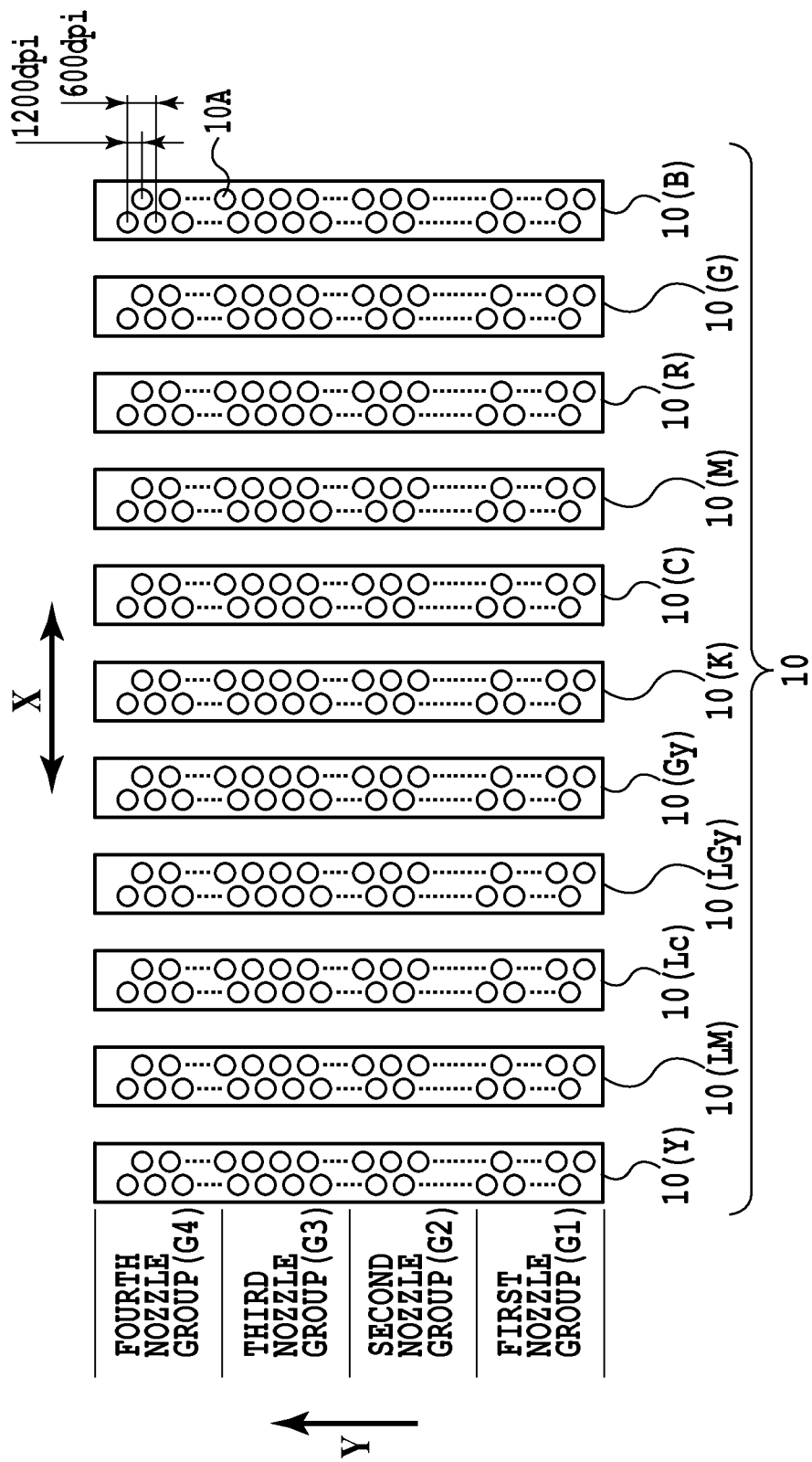
FIG. 2 is a diagram illustrating an example of the configuration of nozzles in a print head used in the ink jet printing apparatus in FIG. 1A.

FIG. 2 illustrates an example of the configuration of the print head used in the present embodiment. In the present example, 11 print heads each with a plurality of ejection ports 10A are detachably mounted on the carriage 53. Reference numerals 10(C), 10(M), 10(Y), and 10(K) denote print heads configured to eject cyan ink (C), magenta ink (M), yellow ink (Y), and black ink (K), respectively, all of which have a high color material concentration. Reference numerals 10(LC) and 10(LM) denote print heads configured to eject light cyan ink (LC) and light magenta ink (LM), respectively, both of which have a low color material concentration. Furthermore, reference numerals 10(R), 10(G), 10(B), 10(Gy), and 10(LGy) denote print heads configured to eject red ink (R), green ink (G), blue ink (B), gray ink (Gy), and light gray ink (LGy), respectively.

In each of the print heads, two nozzle arrays are formed along a predetermined direction crossing the main scanning direction shown by arrow X (in the present example, the predetermined direction crossing the main scanning direction at right angles). In each of the nozzle arrays, a plurality of ejection ports 10A are arranged at a pitch of 600 dpi (dots/inch) so as to form a large number of (for example, 640) nozzles. Furthermore, each of the ejection ports 10A in one of the two nozzle arrays is displaced from the corresponding ejection port 10A in the other nozzle array by half a pitch, that is, 1,200 dpi. Thus, each print head corresponds substantially to one in which a large number of (for example, 1,280) nozzles are arranged at a pitch of 1,200 dpi. Hereinafter, each print head is referred to as a print head arranging 1,280 nozzles in line at a pitch of 1,200 dpi.

In the present embodiment, each print head is divided into a first nozzle group to a fourth nozzle group (G1 to G4) so that one of the nozzle groups is used for each color. The present embodiment adopts a multi-pass printing scheme in which an image in one ink color is completed by eight scans (eight passes) of the print head. In the multi-pass printing scheme, images in a total of 11 colors are completed by 32 scans (32 passes) of the print head. Thus, the printing apparatus in the present embodiment uses the print head in which the plurality of nozzle arrays each with the plurality of nozzles configured to eject ink and arranged along the predetermined direction are provided for the respective types of ink. The inks of the plurality of colors are ejected during the respective scans of the print head to print images.

In the present example, only the first nozzle group G1 is used for the print head 10(K). Furthermore, only the second nozzle group G2 is used for the print heads 10(Gy), 10(R), 10(G), and 10(B). Additionally, only the third nozzle group G3 is used for the print heads 10(C), 10(M), and 10(Y). In addition, only the fourth nozzle group G4 is used for the print heads 10(LC), 10(LM), and 10(LGy).

FIG. 3 to FIG. 6 are diagrams illustrating the multi-pass printing scheme according to the present embodiment. For convenience of description, the print head 10(K), for which the first nozzle group G1 is used, is defined as a first print head 10(1). The print heads 10(Gy), 10(R), 10(G), and 10(B), for which the second nozzle group G2 is used, are defined as a second print head 10(2). Similarly, the print heads 10(C), 10(M), and 10(Y), for which the third nozzle group G3 is used, are defined as a third print head 10(3). The print heads 10(LC), 10(LM), and 10(LGy), for which the fourth nozzle group G4 is used, are defined as a fourth print head 10(4). The total of 1,280 nozzles in each print head are divided into four nozzle groups G1 to G4 each including 320 nozzles. Moreover, each of the nozzle groups is divided into eight nozzle areas. The eight nozzle areas into which the nozzle group G1 is divided are defined as A1 to A8. The eight nozzle areas into which the nozzle group G2 is divided are defined as B1 to B8. The eight nozzle areas into which the nozzle group G3 is divided are defined as C1 to C8. The eight nozzle areas into which the nozzle group G4 is divided are defined as D1 to D8.

Figure 3:
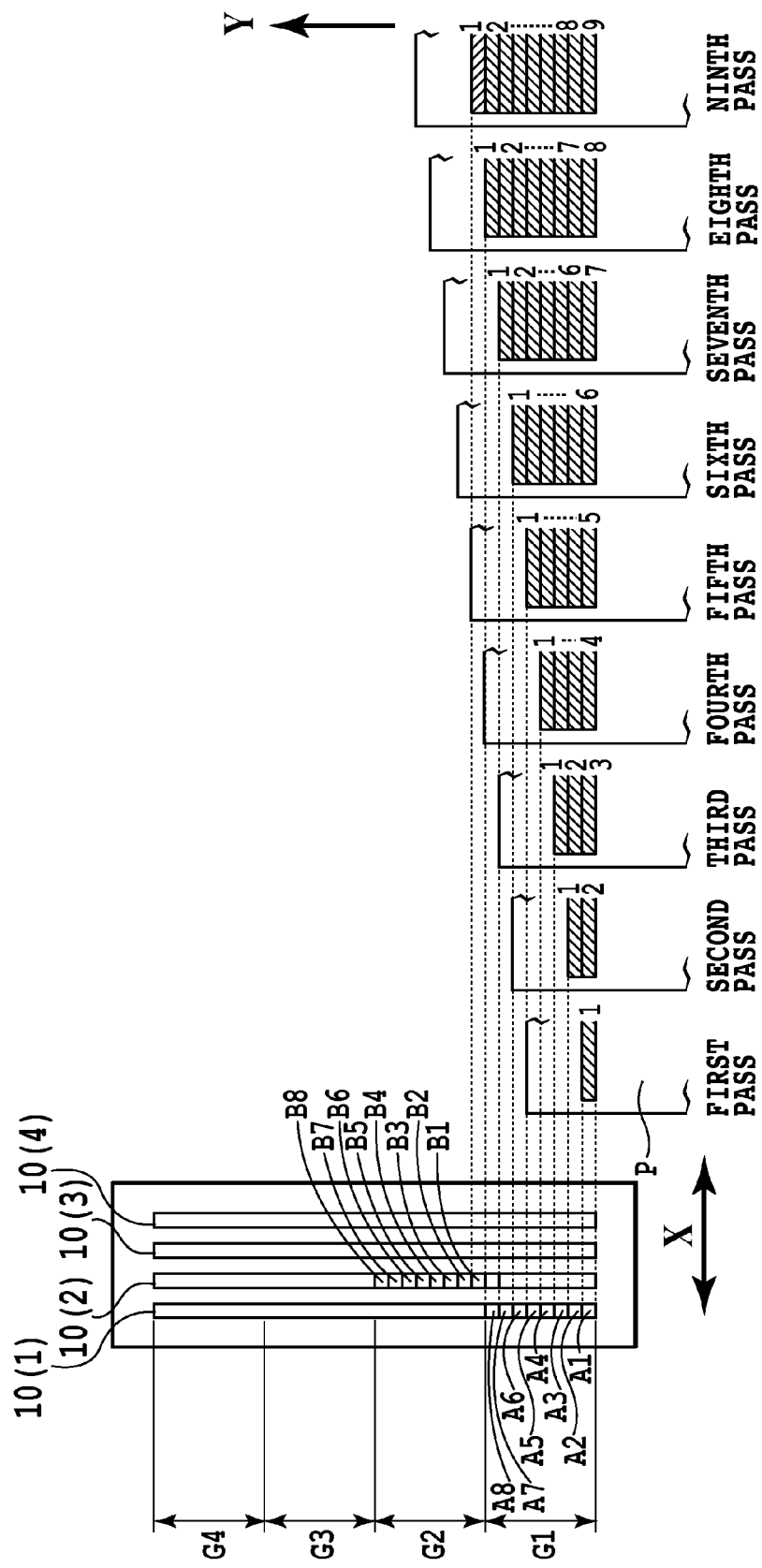
FIG. 3 is a diagram illustrating an example of a multi-pass printing scheme.

FIG. 3 is a diagram illustrating the first pass to the ninth pass. Every time the print head carries out a scan (one pass), the print medium P is conveyed in the sub-scanning direction shown by arrow Y, by a distance corresponding to the width of 40 nozzles. In the 10th and subsequent passes, the print medium P is similarly conveyed. Print areas on the print medium P each corresponding to the amount by which the print medium P is conveyed during one conveying operation are defined as 1, 2, 3, . . . from the downstream side to the upstream side in the print medium conveying direction. In the first pass, the black (K) ink is ejected onto the print area 1 on the print medium P through the nozzle area A1. In the second pass, the black (K) ink is ejected onto the print areas 1 and 2 through the nozzle areas A1 and A2. Then, in the eighth pass, the black (K) ink is ejected through the nozzle areas A1 and A8 to complete an image with the black (K) ink in the print area 1. In this manner, an image with the black (K) ink is completed by the eight passes.

Figure 4:
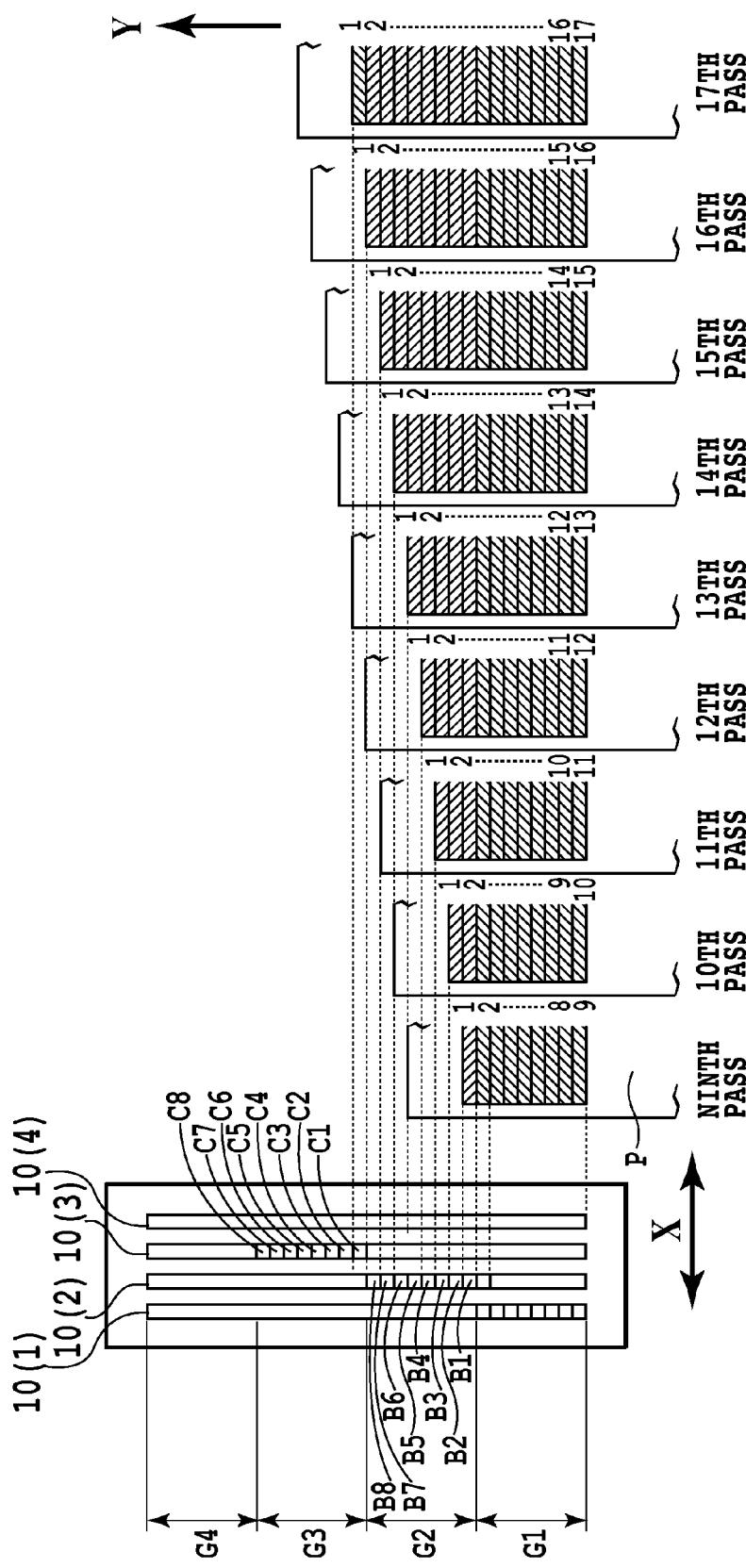
FIG. 4 is a diagram illustrating an example of the multi-pass printing scheme.

FIG. 4 is a diagram illustrating the ninth pass to the 17th pass. In the ninth pass, the gray (Gy) ink, the red (R) ink, the green (G) ink, and the blue (B) ink are ejected onto the print area 1 on the print medium P through the nozzle area B1. In the tenth pass, the gray (Gy) ink, the red (R) ink, the green (G) ink, and the blue (B) ink are ejected onto the print areas 1 and 2 through the nozzle areas B1 and B2. Then, in the 16th pass, the gray (Gy) ink, the red (R) ink, the green (G) ink, and the blue (B) ink are ejected through the nozzle areas B1 and B8 to complete an image with these types of ink in the print area 1. In this manner, an image with the gray (Gy) ink, the red (R) ink, the green (G) ink, and the blue (B) ink is completed by the eight passes.

Figure 5:
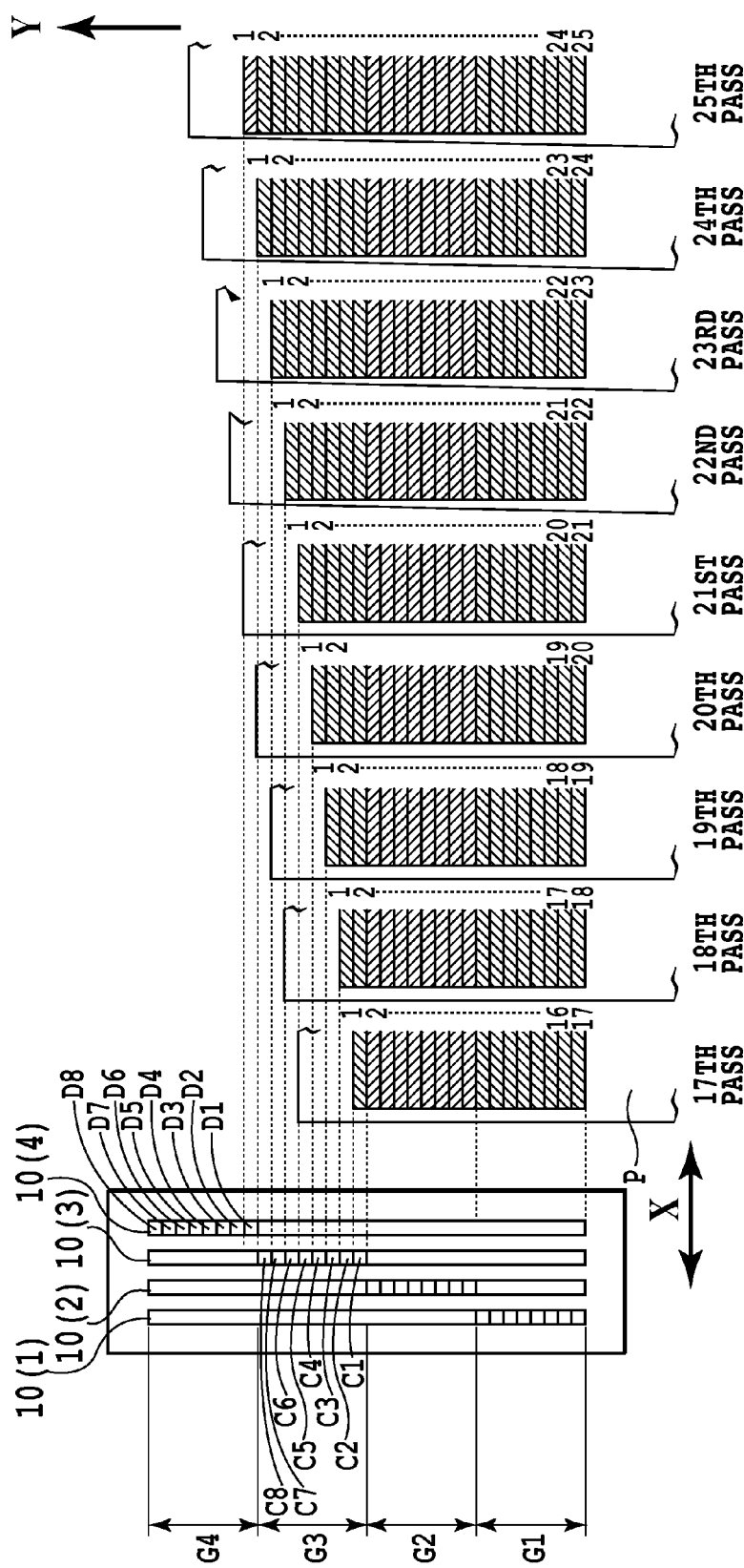
FIG. 5 is a diagram illustrating an example of the multi-pass printing scheme.

FIG. 5 is a diagram illustrating the 17th pass to the 25th pass. In the 17th pass, the cyan (C) ink, the magenta (M) ink, and the yellow (Y) ink are ejected onto the print area 1 on the print medium P through the nozzle area C1. In the 18th pass, the cyan (C) ink, the magenta (M) ink, and the yellow (Y) ink are ejected onto the print areas 1 and 2 on the print medium P through the nozzle areas C1 and C2. Then, in the 24th pass, the cyan (C) ink, the magenta (M) ink, and the yellow (Y) ink are ejected through the nozzle areas C1 to C8 to complete an image with these types of ink in the print area 1. In this manner, an image with the cyan (C) ink, the magenta (M) ink, and the yellow (Y) ink is completed by eight passes.

Figure 6:
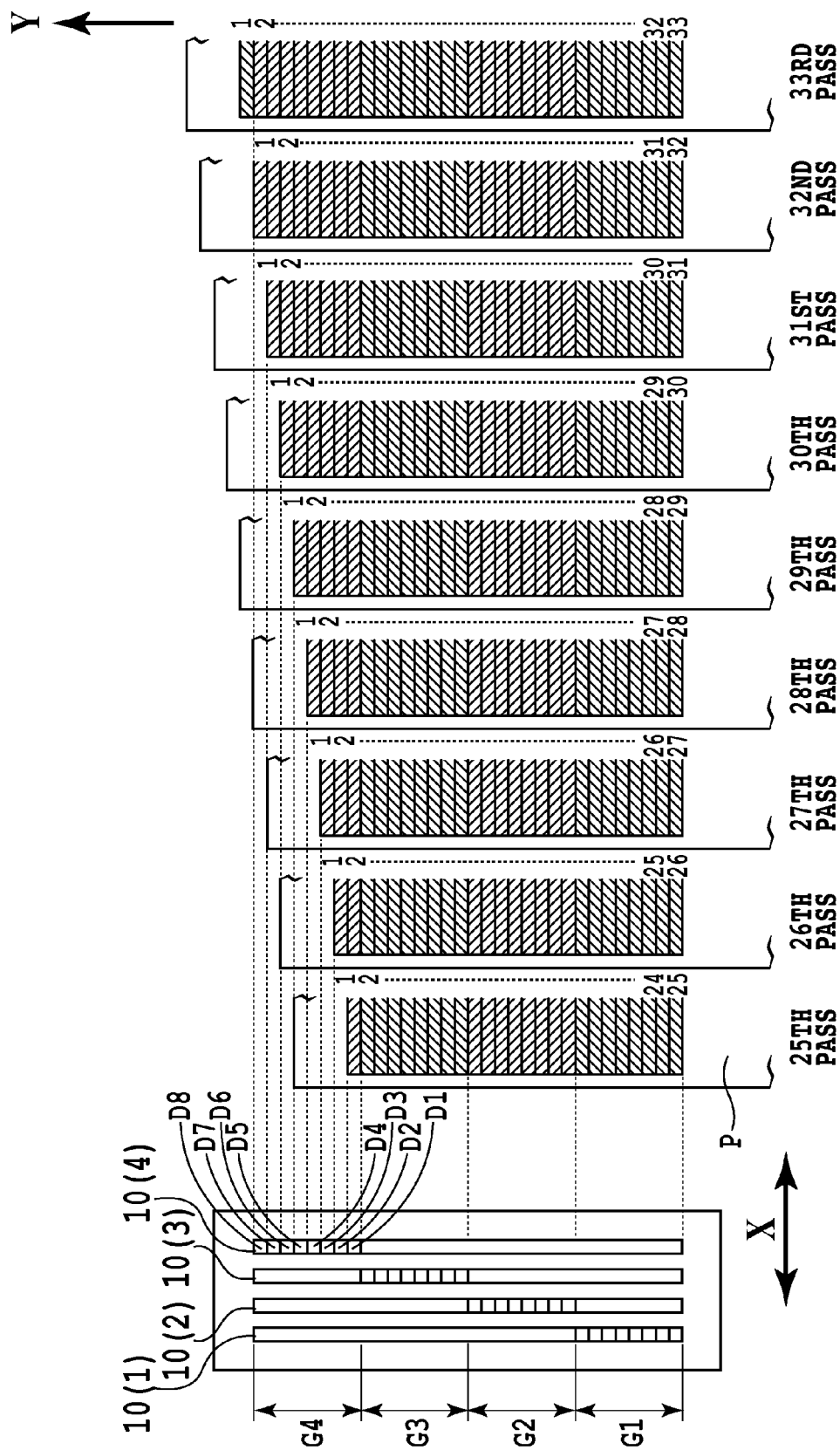
FIG. 6 is a diagram illustrating an example of the multi-pass printing scheme.
Figure 8A:
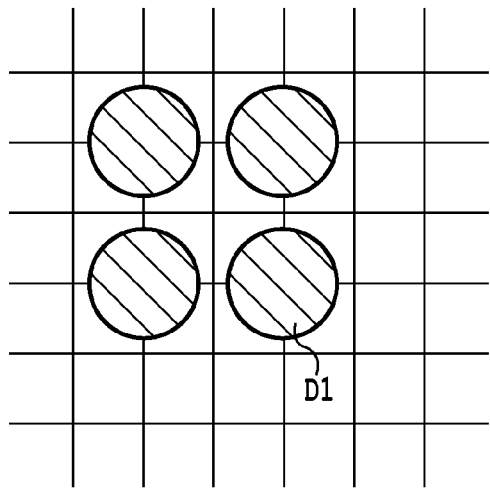
FIG. 8A to FIG. 8D are diagrams illustrating examples of dot formation.
Figure 8B:
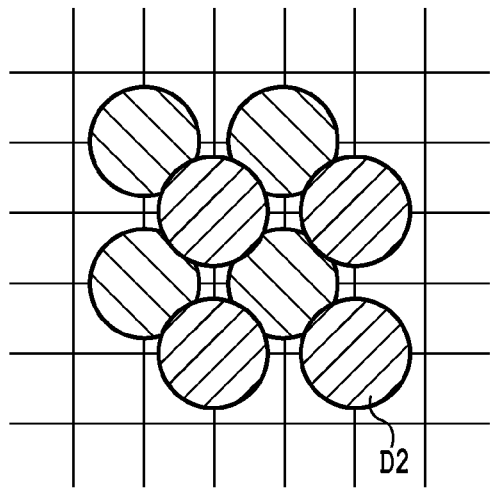
Figure 8C:
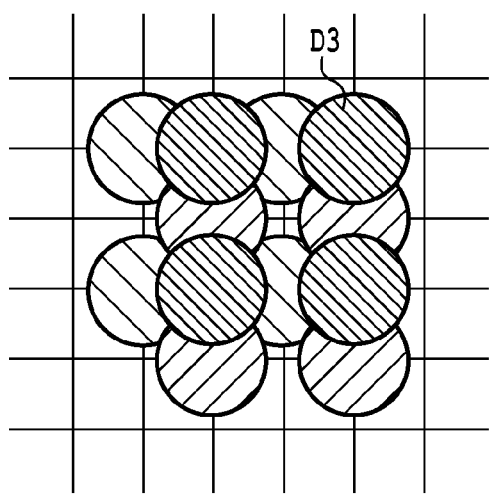
Figure 8D:
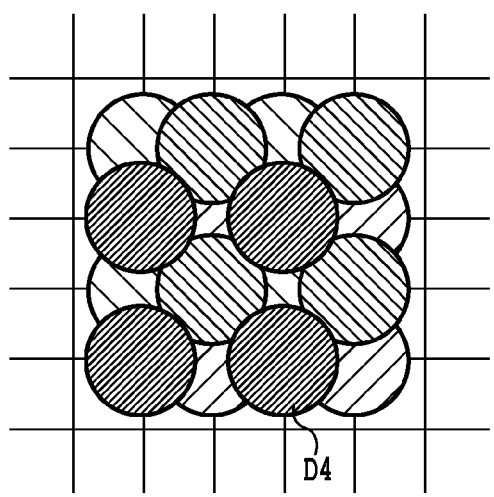

FIG. 6 is a diagram illustrating the 25th pass to the 33rd pass. In the 25th pass, the light cyan (LC) ink, the light magenta (LM) ink, and the light gray (LGy) ink are ejected onto the print area 1 on the print medium P through the nozzle area D1. In the 26th pass, the light cyan (LC) ink, the light magenta (LM) ink, and the light gray (LGy) ink are ejected onto the print areas 1 and 2 through the nozzle areas D1 and D2. Then, in the 32nd pass, the light cyan (LC) ink, the light magenta (LM) ink, and the light gray (LGy) ink are ejected through the nozzle areas D1 to D8 to complete an image with these types of ink in the image area 1. In this manner, an image with the light cyan (LC) ink, the light magenta (LM) ink, and the light gray (LGy) ink is completed by the eight passes.

Thus, in the 32nd pass, an image in the 11 colors is completed in the area 1. The print heads 10(1) to 10(4) repeat similar operations to print images each in the 11 colors in the areas 2, 3, 4, ... during the 33rd, 34th, 35th, .... That is, an image in the 11 colors is completed by the 32 passes.

FIG. 7A to FIG. 7D are diagrams illustrating an example of a mask pattern group used to determine the print ratio for each pass in the full-color 32-pass printing scheme described above. The mask pattern group is used to generate image data to be printed by a plurality of passes, from image data to be printed in the print areas. In FIG. 7A to FIG. 7D, a squarely-framed enlarged portion indicates a mask pattern. Black portions in the enlarged portion indicate printing allowed pixels allowed to be printed.

FIG. 7A shows an example of a mask pattern group for the print head 10(K) (first print head 10(1)) from which the black (B) ink can be ejected through the nozzle group G1 (nozzle areas A1 to A8). The mask pattern group includes eight mask patterns corresponding to the nozzle areas A1 to A8. FIG. 7B shows an example of a mask pattern group for the print head 10(Gy) (second print head 10(2)) from which the gray (Gy) ink can be ejected through the nozzle group G2 (nozzle areas B1 to B8). The mask pattern group includes eight mask patterns corresponding to the nozzle areas B1 to B8. The mask patterns for the other print heads 10(2), that is, the print heads 10(R), (G), and 10(B), are similarly configured. However, the mask patterns for the print heads 10(Gy), 10(R), 10(G), and 10(B) are configured so as to minimize overlapping, at the same position, of dots formed by the ink ejected from the print heads during the same pass. That is, displacement of the positions of the printing allowed pixels during the same pass is maximized.

FIG. 7C shows an example of a mask pattern group for the print head 10(C) (third print head 10(3)) from which the cyan (C) ink can be ejected through the nozzle group G3 (nozzle areas C1 to C8). The mask pattern group includes eight mask patterns corresponding to the nozzle areas C1 to C8. The mask patterns for the other print heads 10(3), that is, the print heads 10(M) and 10(Y), are similarly configured. However, the mask patterns for the print heads 10(C), 10(M), and 10(Y) are configured so as to minimize overlapping, at the same position, of dots formed by the ink ejected from the print heads during the same pass, that is, so as to displace the positions of the printing allowed pixels. FIG. 7O shows an example of a mask pattern group for the print head 10(LGy) (fourth print head 10(4)) from which the light gray (LGy) ink can be ejected through the nozzle group G4 (nozzle areas D1 to D8). The mask pattern group includes eight mask patterns corresponding to the nozzle areas D1 to D8. The mask patterns for the other print heads 10(4), that is, the print heads 10(LC) and 10(LM), are similarly configured. However, the mask patterns for the print heads 10(LGy), 10(LC), and 10(LM) are configured so as to minimize overlapping, at the same position, of dots formed by the ink ejected from the print heads during the same pass. That is, displacement of the positions of the printing allowed pixels during the same pass is maximized.

As described above, during the same pass, the ink ejected from the print heads using the same nozzle group is ejected onto the print medium P so as to overlap. During the same pass, the ink ejected from the print heads using different nozzle groups are ejected onto the print medium P so as to avoid overlapping. Printing with the first print head 10(1), which uses the first nozzle group G1, is started. The printing of particular print areas with the ink ejected from the first print head 10(1) is completed. Then, printing of these print areas with the second print head 10(2), which uses the second nozzle group G2, is started. The printing of the print areas with the ink ejected from the second print head 10(2) is completed. Then, printing of the print areas with the third print head 10(3), which uses the third nozzle group G3, is started. The printing of the print areas with the ink ejected from the third print head 10(3) is completed. Then, printing of the print areas with the fourth print head 10(4), which uses the fourth nozzle group G4, is started. Then, the printing with the ink ejected from the fourth print head 10(4) is completed to complete printing an image with the full-color ink. Thus, the ink ejected during the final scan of the fourth print head 10(4) is positioned at the front outermost ink layer (the front outermost surface of the print area) formed on the print medium. For example, in a four-pass printing scheme, if ink dots D1, D2, D3, and D4 are formed on the print medium during the first to fourth passes, respectively, as shown in FIG. 8A to FIG. 8D, the ink dots D4 formed during the final scan are positioned in the front outermost layer. Furthermore, if dots D1, D2, D3, or D4 are formed using different types of ink during the same pass, the positions of the dots D1, D2, D3, and D4 are desirably displaced from each other so as to avoid overlapping, as shown in FIG. 8A to FIG. 8D.

Figure 9A:
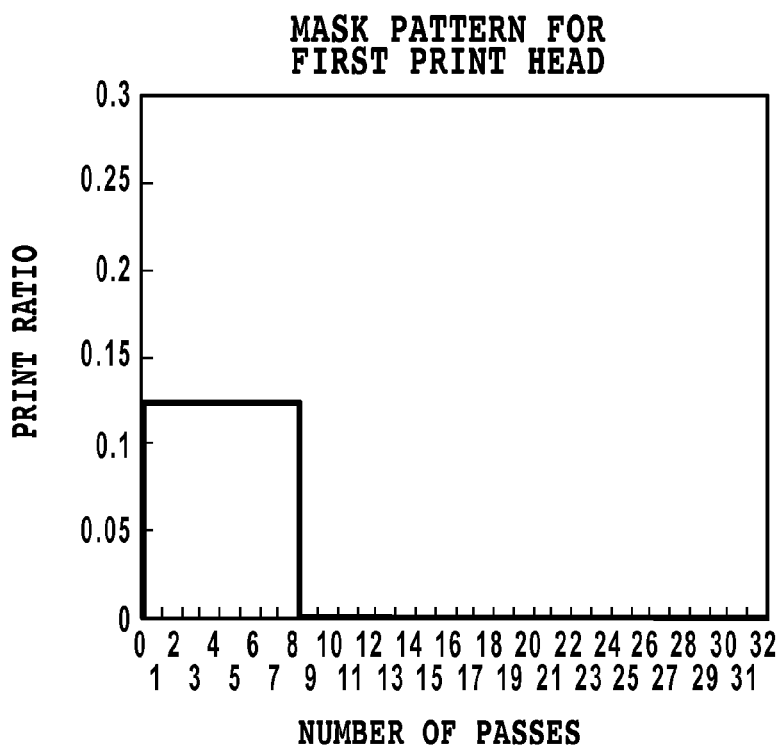
FIG. 9A to FIG. 9D are diagrams of mask patterns for the first to fourth print heads, respectively.
Figure 9B:
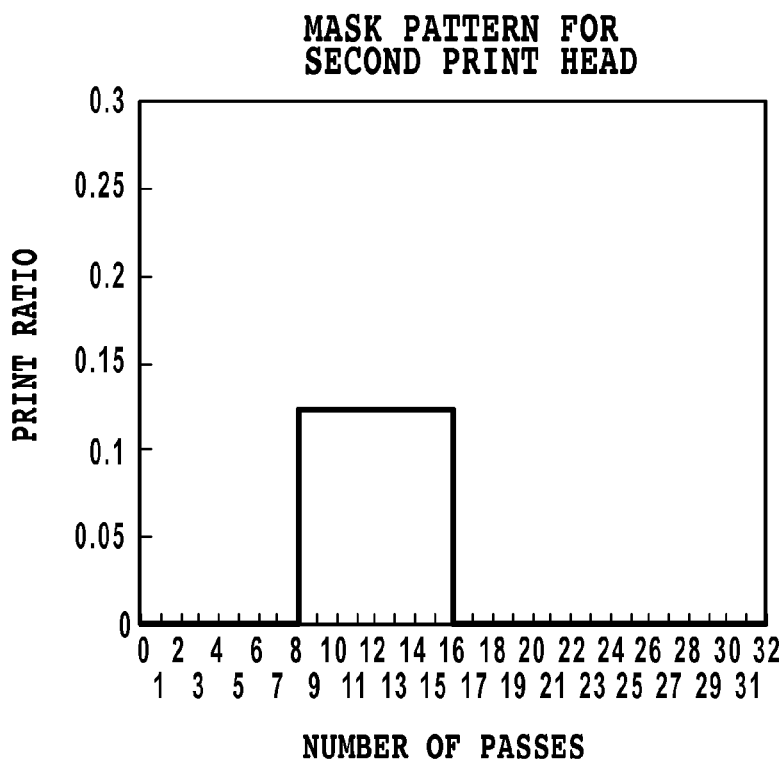
Figure 9C:
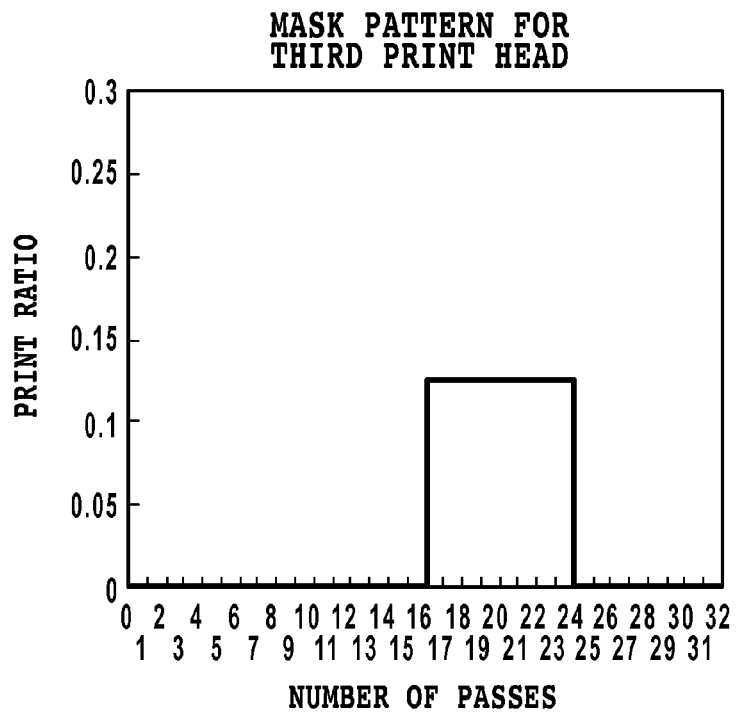
Figure 9D:
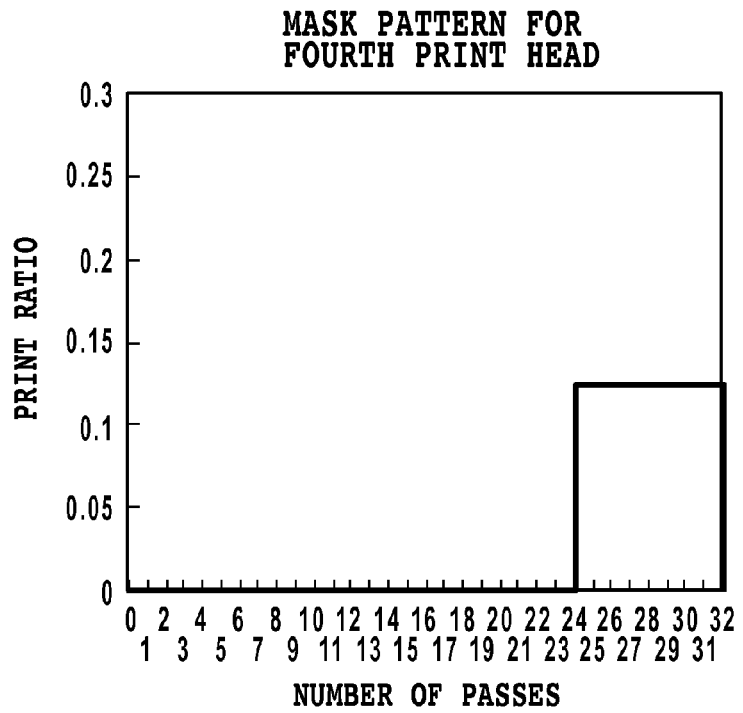

In the present example, such mask patterns as shown in FIG. 9A to FIG. 9D are used. FIG. 9A shows a mask pattern for the first print head 10(1). In the mask pattern, all the nozzles in the first nozzle group G3 have an equal use ratio (print ratio) of 12.5%. The total print ratio for eight passes is 100% (=12.8×8). That is, the eight mask pattern portions corresponding to the nozzle areas D1 to D8 have an equal print ratio of 12.8%. Similarly, as shown in FIG. 9B to FIG. 9D, the mask patterns for the second, third, and fourth heads 10(2), 10(3), and 10(4) also have an equal print ratio of 12.5%. Nozzles unused always have a print ratio of 0%. Thus, since all the nozzles to be used in each pass have an equal use ratio, the print rate for each pass is uniform in a print band of a width corresponding to the amount by which the print medium P is conveyed during each operation. This reduces the likelihood of density unevenness.

In general, the gloss of a substance depends dominantly on the front outermost layer of the substance. As in the case where the surface of the substance is varnished, plated or covered with a metal foil, in the ink jet printing scheme, the ink layer forming the front outermost layer acts dominantly on the gloss. Thus, the surface gloss of printed matter can be improved by increasing the glossiness of the ink positioned in the front outermost ink layer formed on the print medium, that is, the ink ejected during the final scan of the fourth print head 10(4).

As described above, as is well known, ink droplets ejected during the same pass come into contact with one another before fixation on the surface of the print medium is completed. Then, leveling occurs to reduce the irregularities on the surface of the print medium to improve the gloss (Japanese Patent Laid-Open No. 2005-297212). However, when printing is performed such that ink droplets come into contact with one another on the print medium, the size of dots is increased to make particularly colors with low lightness noticeable. This may degrade the granularity. Furthermore, previously formed ink dots may hinder permeation of subsequently ejected ink droplets. Then, the subsequent ink may concentrate and aggregate in an uncolored area on the print medium in which ink dots have not been formed yet. Thus, ink with a high color material concentration becomes massive during the aggregation. This makes the irregularities on the surface of the print medium larger to allow light to scatter more wildly. As a result, the gloss of the surface may be degraded. Moreover, since ink with a high color material concentration and a low lightness is more noticeable, localization and aggregation of such ink may also degrade the granularity. Hence, according to the method disclosed in Japanese Patent Laid-Open No. 2008-16209, the granularity of images may be degraded, and the irregularities on the surface of the print medium may be made larger, resulting in the difficulty of improving the gloss.

In the present embodiment, light color ink, which has a low color material concentration, is noted which serves to make the degraded granularity of images unnoticeable and which prevents the irregularities on the surface of the print medium from becoming larger as a result of aggregation. That is, if inks in plurality of colors ejected by the print head include dark color ink and light color ink, which have different color material concentrations, the light color ink is ejected during the final pass, in which the fourth nozzle group G4 is used, so as to form the front outermost layer on the print medium. Moreover, the mask pattern used to eject the light color ink is formed such that droplets of the light color ink come into contact with one another during the same pass, leading to the a high likelihood of leveling, which makes the irregularities smaller. That is, this mask pattern is provided with more printing allowed pixels each with a printing allowed pixel present adjacent thereto than the mask patterns for the other types of ink. An increase in "the number of printing allowed pixels each with a printing allowed pixel present adjacent thereto" increases the connectivity of ink dots formed during the same pass.

Figure 10A:
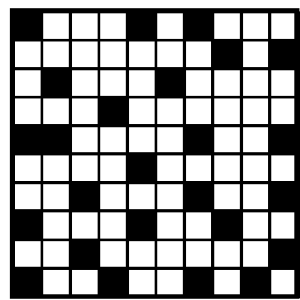
FIG. 10A to FIG. 10D are each a diagram illustrating a level of cluster formation.
Figure 10B:
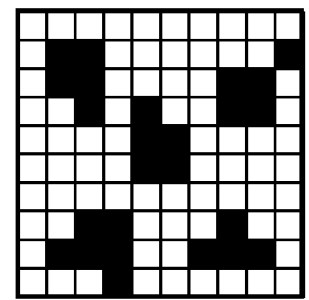

FIG. 10A and FIG. 10B show examples of masks among which the "number of printing allowed pixels each with a printing allowed pixel present adjacent thereto" varies. Each of FIG. 10A to FIG. 10D shows a part of a four-pass printing mask which corresponds to one pass in an area of 10×10 pixels. The number of printing allowed pixels is the same for both the masks in FIG. 10A and FIG. 10B. FIG. 10A shows a second mask pattern in which the "number of printing allowed pixels each with a printing allowed pixel present adjacent thereto" is 10. FIG. 10B shows a first mask pattern in which the "number of printing allowed pixels each with a printing allowed pixel present adjacent thereto" is 25. The "number of printing allowed pixels each with a printing allowed pixel present adjacent thereto" in the first mask pattern is larger than that in the second mask pattern. The present embodiment uses the first mask pattern to generate light ink print data.

Figure 10C:
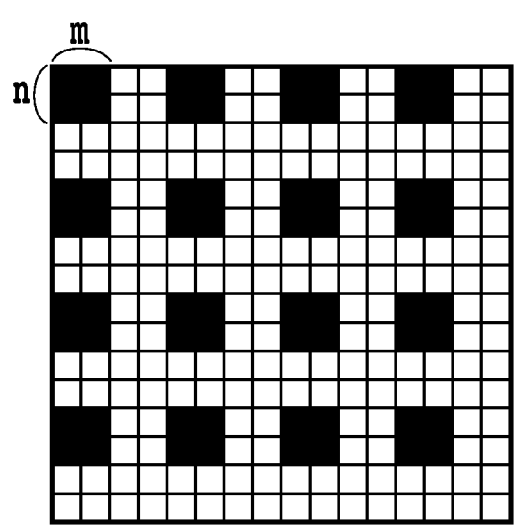
Figure 10D:
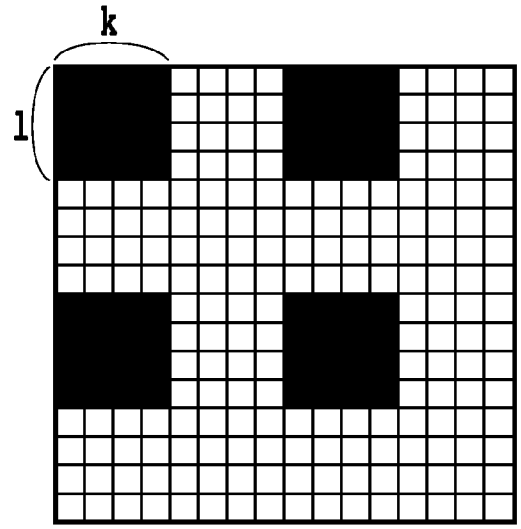

Furthermore, FIG. 10C and FIG. 10D show other examples of mask patterns. The "number of printing allowed pixels each with a printing allowed pixel present adjacent thereto" in both mask patterns are the same numbers (64 in both FIG. 10C and FIG. 10D). However, a cluster size varies significantly between the mask patterns in FIGS. 10C and 10D. In FIG. 10C, clusters each of 2×2 pixels are arranged. In FIG. 10D, clusters each of 4×4 pixels are arranged. The manner of distribution of the pixels varies between FIGS. 10C and 10D. In a mask with clusters each of m×n pixels arranged therein and a mask with clusters each of k×l pixels arranged therein, m, n, k, and l are integers, and one of m and n and one of k and l may each be at least 2. In case where the "number of printing allowed pixels each with a printing allowed pixel present adjacent thereto", in mask patterns are the same numbers, when k×l m×n, the mask with the clusters each of k×l pixels arranged therein is used to generate light ink print data.

Furthermore, for printing allowed pixels in the same pass based on mask patterns, connection based on m×n dots was experimentally determined to improve glossiness more significantly than connection based on k×l dots. This is expected to be because the edges of each dot have irregularities and is likely to scatter light but because when dots are connected together to level one another, the edges of each become cleaner to make light unlikely to scatter. Thus, light ink dots forming the front outermost ink layer on the print medium level one another to reduce the irregularities on the surface of the layer. This allows the gloss to be improved while avoiding degradation of the granularity.

As described above, the mask pattern for the fourth nozzle group G4 through which the ink is ejected during the pass including the final scan serves to increase the level of cluster formation and the "number of printing allowed pixels each with a printing allowed pixel present adjacent thereto". On the other hand, in the mask patterns for the other nozzle groups G1 to G3, the dots are sparsely distributed so as to reduce the level of cluster formation to make the dots unlikely to come into contact with one another during the same pass and desirably to achieve a discrete dot arrangement for the same pass. Furthermore, preferably, in a plurality of scans of the print head that ejects the ink used to form dots for the front outermost ink layer (front outermost surface), at least the connectivity of the dots formed by the final scan may be set to be higher than that of the other ink dots formed in the print area.

Figure 11:
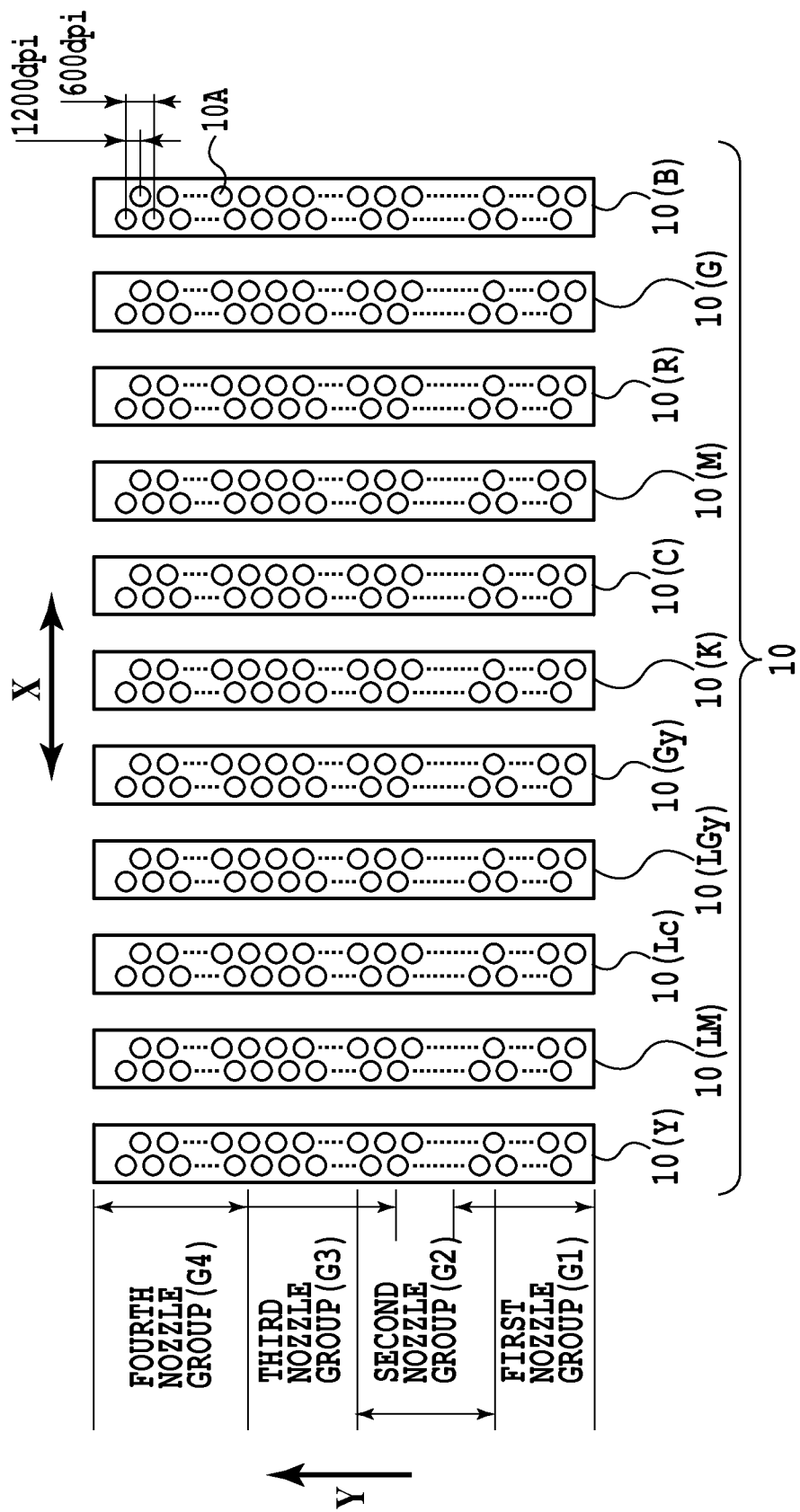
FIG. 11 is a diagram illustrating another example of the positional relationship among a plurality of nozzle groups in the print head.
Figure 12A:
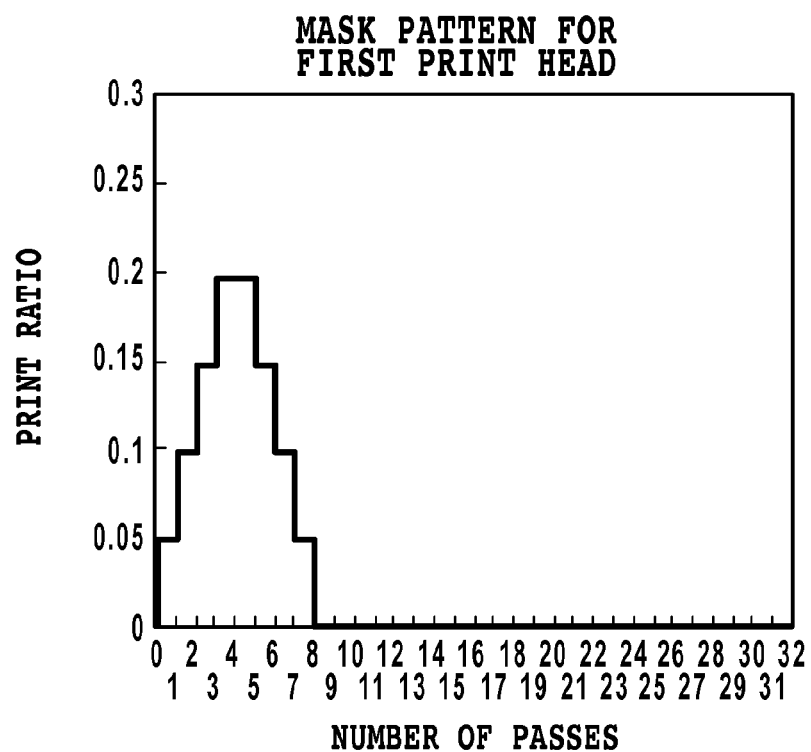
FIG. 12A to FIG. 12D are diagrams of another example of mask patterns for the first to fourth print heads, respectively.
Figure 12B:
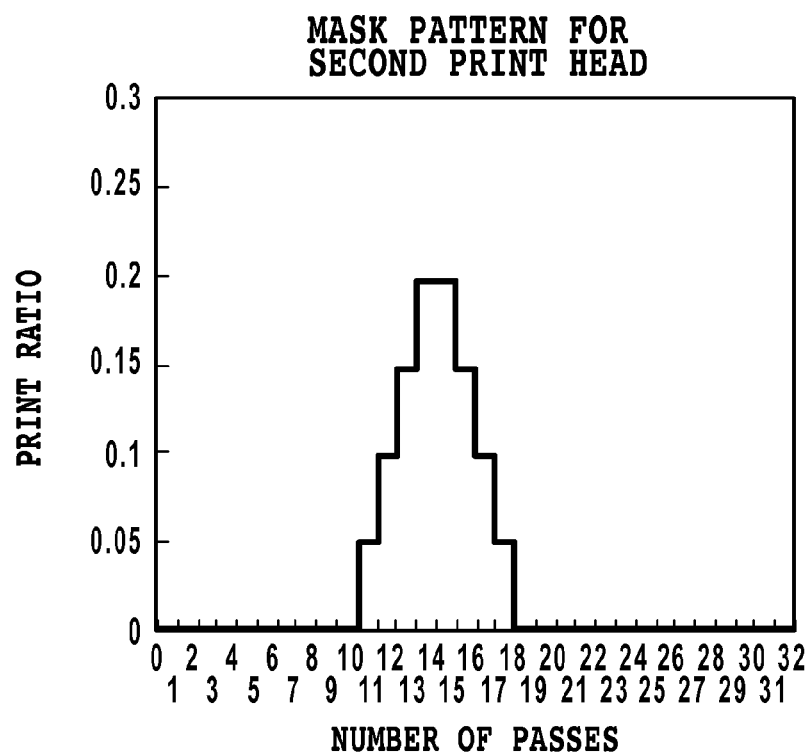
Figure 12C:
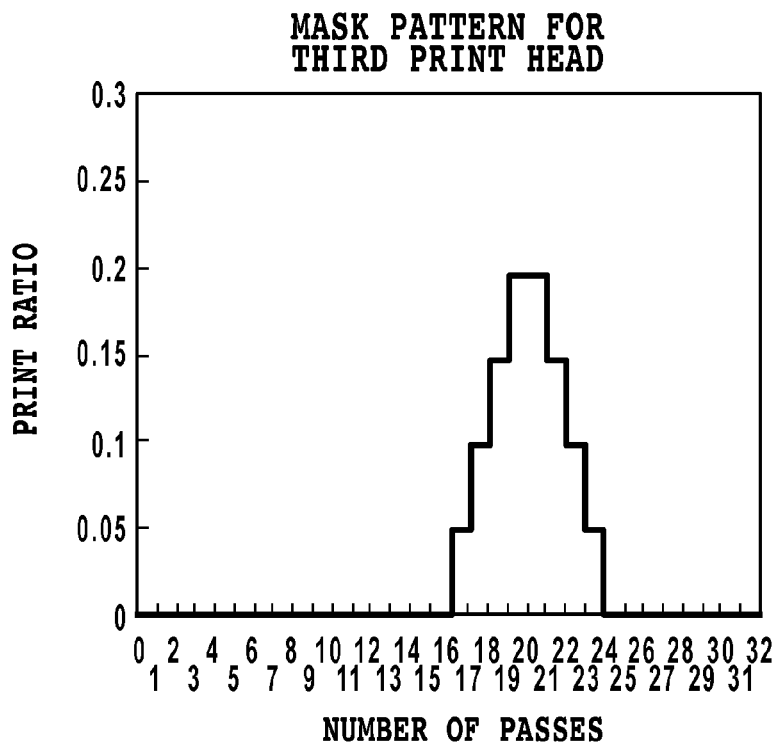
Figure 12D:
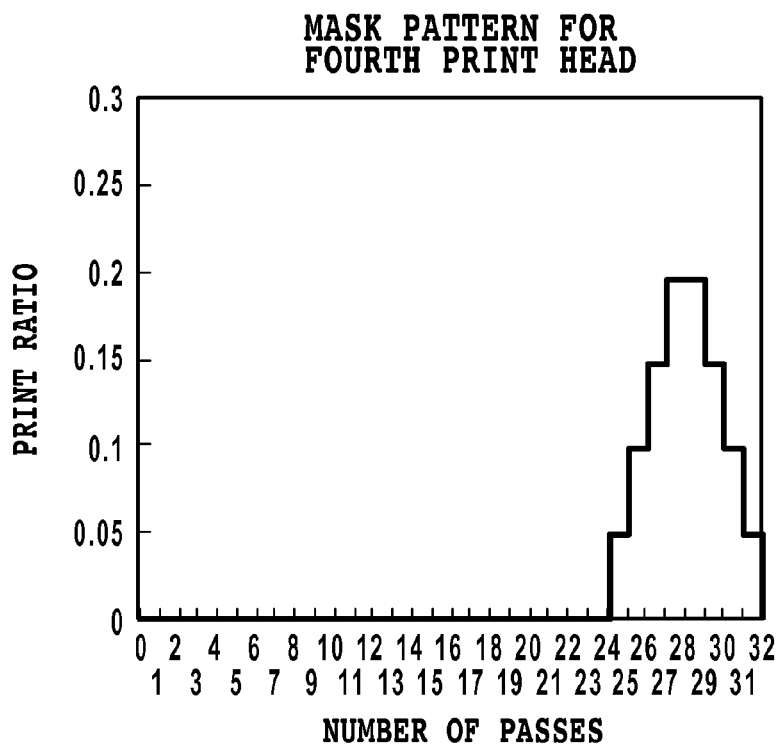
Figure 13A:
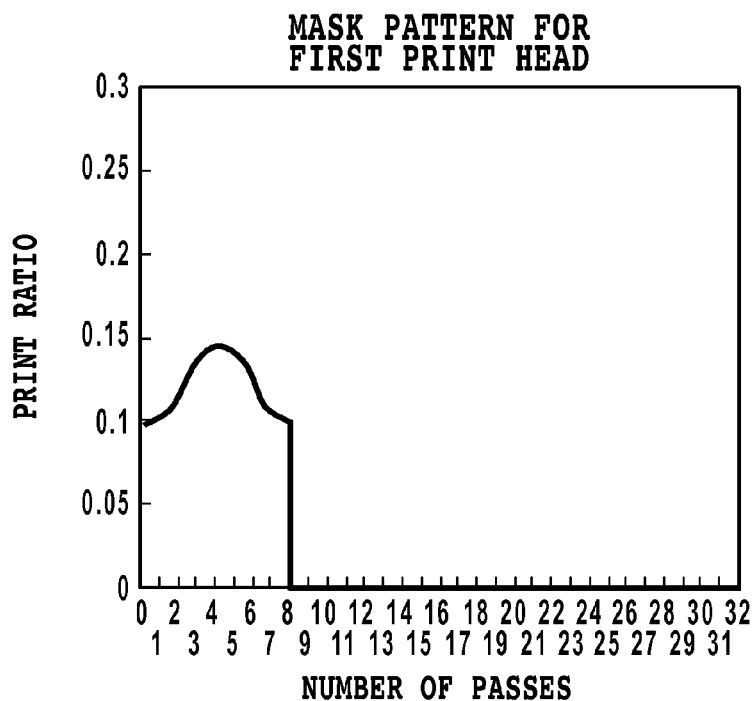
FIG. 13A to FIG. 13D are diagrams of yet another example of mask patterns for the first to fourth print heads, respectively.
Figure 13B:
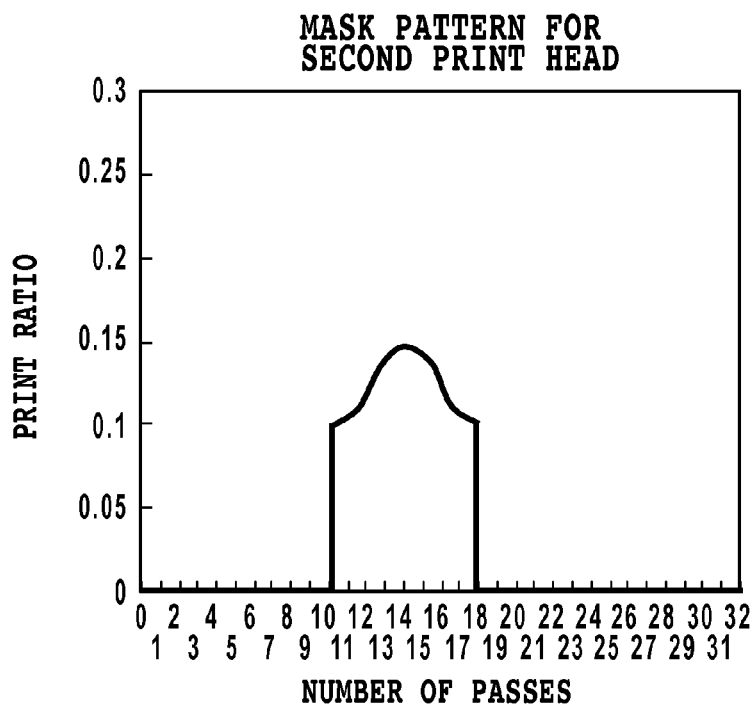
Figure 13C:
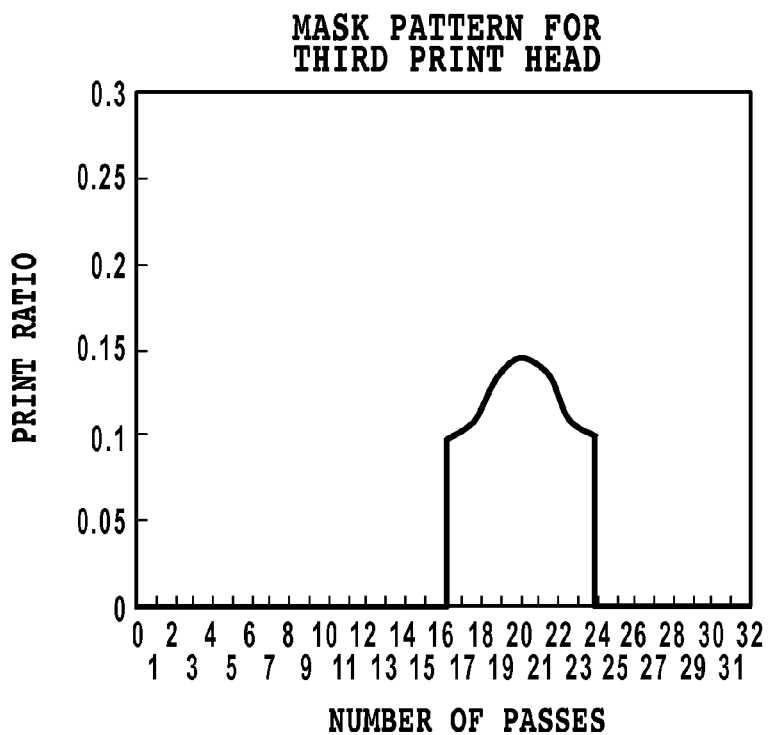
Figure 13D:
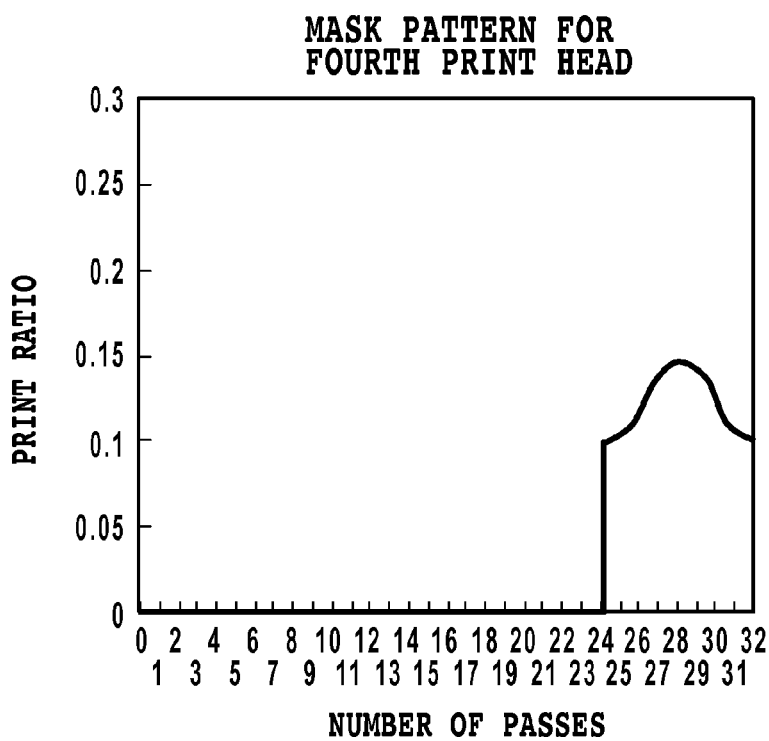

The number of nozzle groups is not limited four as in the present example but may be at least two. The print head may be divided into nozzle groups so as to enable determination of one of the nozzle groups through which the ink used to form the front outermost layer is ejected. Furthermore, for the nozzle group through which the ink used to form the front outermost layer is ejected, successfully increasing the glossiness of the ink color enables the surface gloss of the print medium (printed matter) with an image printed thereon to be improved. Thus, the plurality of nozzle groups need not necessarily be limited to such an exclusive positional relationship as shown in FIG. 2, that is, such a positional relationship as to prevent overlapping of the positions of the nozzle groups in the nozzle array direction. That is, for the nozzle group through which the ink used to form the front outermost layer is ejected during the final scan, the level of leveling for the ink may be set to be higher than that for the other ink. For example, if the total number of nozzles in one nozzle array is smaller than 1,280 or the number of nozzles forming one nozzle group is larger than 320, the positions of the nozzle groups resulting from the division may partly overlap as shown in FIG. 11.

Furthermore, the nozzle group used for the final scan is desirably in an exclusive positional relationship with the other nozzle groups such that the positions of the nozzle groups do not overlap. In particular, the nozzle area D8 in the nozzle group G4, used for the final scan, is desirably in an exclusive positional relationship with the other nozzle groups. The nozzle areas other than the nozzle area D8, used for the final scan, may positionally overlap the other nozzle groups. Furthermore, the numbers of nozzles included in the plurality of nozzle groups resulting from the division need not necessarily be the same. The number of nozzles included in the nozzle group used for the final scan may be larger than those of nozzles included in the other nozzle groups.

Second Embodiment

Provided that the front outermost ink layer formed on the print medium can be leveled to improve the gloss, the glossiness of the print medium with an image printed thereon is increased. Thus, the ink forming the outermost layer need not necessarily be in a light color, which has a low color material concentration. The glossiness of the print medium with an image printed thereon may be improved provided that the ink is unlikely to make the surface irregularities larger even when aggregated.

In the present embodiment, the yellow (Y) ink, which has a high color material concentration but which is unnoticeable owing to its low lightness, is ejected during the final pass with the fourth nozzle group so as to form the front outermost layer. The mask pattern used in this case has a large "number of printing allowed pixels each with a printing allowed pixel present adjacent thereto" as described in the first embodiment. This allows the gloss to be improved without degrading the granularity of images. Furthermore, not only the yellow (Y) ink but also light color ink, which makes the dots unnoticeable, may be ejected during the final scan with the fourth nozzle group so as to form the front outermost layer.

Third Embodiment

In the print mode according to the first embodiment, some nozzle groups are not used to print images. However, these nozzle groups may be used in a different print mode. The nozzle groups not used even in the different print mode may be omitted. At least for the nozzles through which the ink not used to form the front outermost layer is ejected, at least those corresponding to the nozzle group (in the above-described embodiments, the fourth nozzle group) used to form the front outermost layer may be omitted. In contrast, for the nozzles through which the ink used to form the front outermost layer is ejected, those corresponding to the nozzle groups other than that (in the above-described embodiments, the fourth nozzle group) used to form the front outermost layer may be omitted. In short, the nozzle groups not used to eject the ink may be omitted.

Fourth Embodiment

Excessively long nozzle arrays in the print head and an excessively small number of passes may relatively reduce the accuracy with which the print medium is conveyed in the sub-scanning direction. This may make joint portions between areas printed during the respective passes (joints between the ends of bands) noticeable. In this case, mask patterns with step-like print ratios may be used as shown in FIG. 12A to FIG. 12D. The mask patterns allow the ink in the different colors to be printed by eight passes as in the case of the above-described embodiments. The print ratio is 5% for the first and eighth passes, 10% for the second and seventh passes, 15% for the third and sixth passes, and 20% for the fourth and fifth passes. The total of the print ratios for the eight passes is 100%. The print ratio for the nozzles unused is always 0%.

If print unevenness in a band printed by each pass is unnoticeable, mask patterns with graded print ratios as shown in FIG. 13A to FIG. 13D may be used. The mask patterns allow the ink in the different colors to be printed by eight passes as in the case of the above-described embodiments. The print ratio varies among the passes and varies even within one band depending on the position in the nozzle array direction. However, the total of the print ratios for the eight passes is 100%. The print ratio for the nozzles unused is always 0%.

Other Embodiments

The present invention may also be implemented as follows. A software program adapted to implement the functions of the above-described embodiments is supplied remotely or directly to a system or an apparatus. A computer in the system or apparatus reads and executes the supplied program code. Furthermore, the present invention includes an aspect of a storage medium in which a software program adapted to implement the functions of the above-described embodiments is stored. A computer configured to read the program stored in the storage medium can then implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-287539, filed Dec. 18, 2009, which is hereby incorporated by reference herein in its entirety.

What is claimed is:

1. An ink jet printing apparatus configured to print an image on a predetermined region of a print medium during a first number of times of scans of a print head comprising a first nozzle array for ejecting a first ink and a second nozzle array for ejecting a second ink having lightness lower than that of the first ink, the apparatus comprising:

a generation unit configured to generate first data for ejecting the first ink during a second number of times of scans included in the first number of times of the scans based on first mask patterns and to generate second data for ejecting the second ink during a third number of times of scans included in the first number of times of the scans based on second mask patterns, the second number of times of the scans including a final scan of the first number of times of the scans, the third number of times of the scans not including the final scan, and the number of printing allowed pixels each with a printing allowed pixel present adjacent thereto in the second mask patterns being smaller than that of the first mask patterns, and a print controlling unit configured to print the image using the print head based on the first data and the second data.

2. The ink jet printing apparatus according to claim 1, wherein a color of the first ink is similar to a color of the second ink and a material density of the first ink is lower than that of the second ink.

3. The ink jet printing apparatus according to claim 1, wherein the second ink is one of cyan ink, magenta ink, and black ink, and the first ink is yellow ink.

4. The ink jet printing apparatus according to claim 1, wherein the first and second nozzle arrays are arranged along a scanning direction of the print head.

5. The ink jet printing apparatus according to claim 1, wherein the second number of times of scans are successive scans.

6. The ink jet printing apparatus according to claim 1, wherein the second number of times of the scans and the third number of times of the scans are the same.

7. The ink jet printing apparatus according to claim 1, wherein each of the second number of times of the scans is different from any of the third number of times of scans.

8. An ink jet printing method of printing an image on a predetermined region of a print medium during a first number of times of scans of a print head comprising a first nozzle array for ejecting a first ink and a second nozzle array for ejecting a second ink having lightness lower than that of the first ink, the method comprising:

generating first data for ejecting the first ink during a second number of times of scans included in the first number of times of the scans based on first mask patterns, and second data for ejecting the second ink during a third number of times of scans included in the first number of times of the scans based on second mask patterns, the second number of times of the scans including a final scan of the first number of times of the scans, the third number of times of the scans not including the final scan, and the number of printing allowed pixels each with a printing allowed pixel present adjacent thereto in the second mask patterns being smaller than that of the first mask patterns, and printing the image using the print head based on the first data and the second data.

9. A storage medium in which a computer readable program is stored, the program allowing a computer to function as a data generation apparatus that generates data allowing a print head to apply first and second inks to a predetermined region on a print medium during a first number of times of scans of the print head, the second ink having lightness lower than that of the first ink, wherein the function of the data generation apparatus is executed such that a first data allowing the print head to apply the first ink to the predetermined region during a second number of times of scans included in the first number of times of the scans is generated based on first mask patterns and a second data allowing the print head to apply the second ink to the predetermined region during a third number of times of scans included in the first number of times of the scans is generated based on second mask patterns in which the number of printing allowed pixels each with a printing allowed pixel present adjacent thereto is smaller than that of the first mask patterns, the second number of times of the scans including a final scan of the first number of scans, and the third number of times of the scans not including the final scan.

* * * * *